July 5, 1938.   P. M. BOURDON   2,122,736
TIRE
Filed June 13, 1936

INVENTOR
Pierre Marcel Bourdon
BY
his ATTORNEYS

Patented July 5, 1938

2,122,736

UNITED STATES PATENT OFFICE 2,122,736

TIRE

Pierre Marcel Bourdon, Paris, France, assignor to Michelin & Cie, Clermont-Ferrand, France, a corporation of France Application June 13, 1936, Serial No. 85,152
In France June 13, 1935

7 Claims. (Cl. 152—209)

The present invention relates to vehicle tires and more particularly to an improved tire construction by virtue of which the non-skid and wearing qualities of the tire are greatly improved over those of tires now available, and the susceptibility of the non-skid construction to interference by dirt, mud, stones, pebbles, etc., is materially lessened. This invention constitutes an improvement and commercially important advance over the tire disclosed in my application Serial No. 33,434, filed July 27, 1935 and assigned to the same assignee as the present application.

In the prior application, supra, there is disclosed an improved non-skid tire having certain portions of its tread surface formed into a series of flexible ribs arranged radially around the tire. In some forms, some or all of its ribs are made in sinuous or zig-zag form. In effect, this produces a corrugated type of construction on the side surfaces of the ribs, the corrugations of which extended substantially perpendicularly to the tread surface of the tire. The juxtaposed ribs have slits or grooves between them, the contour of which is defined by the corrugated side surfaces of the ribs; that is, the grooves are defined by wavy rib surfaces having more or less cylindrical curvature. This produces a continuous series of openings between ribs in the form of circular or semi-circular holes which extend downwardly from the tread surface of the tire into the tread for a substantial depth.

The ribs described above have effected a substantial improvement in anti-skid types of tires, particularly because they are formed by moulding relatively deep grooves in the tire tread thereby increasing the adhesive friction of the tire on the road and serving as a means for setting up effective resistance against lateral motion of the tire which tends to make the tire skid.

The principal feature of my present invention relates to the formation of the above described corrugations and more especially to the direction in which they extend with respect to the ribs in which they are formed and with respect to the contacting surface of the tire. In my present tire, the ribs are moulded in the tread according to an operation somewhat similar to that employed for making the tire in my copending application, supra, but with the important exception that the corrugations formed in the side surfaces of the ribs are formed obliquely of the ribs and obliquely to the contacting tread surface instead of at right angles or substantially perpendicularly thereto.

An object of my invention is to provide a vehicle tire a portion of whose tread surface has formed therein a series of flexible ribs radially displaced around the tire and the ribs having corrugated side surfaces the corrugations of which extend obliquely of the ribs and to the road contacting tread surface of the tire such that mud, dirt, stones, pebbles, and other such bodies may not easily penetrate into the grooves between these ribs.

The novel features of my invention are set forth with particularity in the appended claims. The invention, itself, however, both as to its organization and method of operation will be easily understood by reference to the following description taken in conjunction with the accompanying drawing in which:

Figure 1:
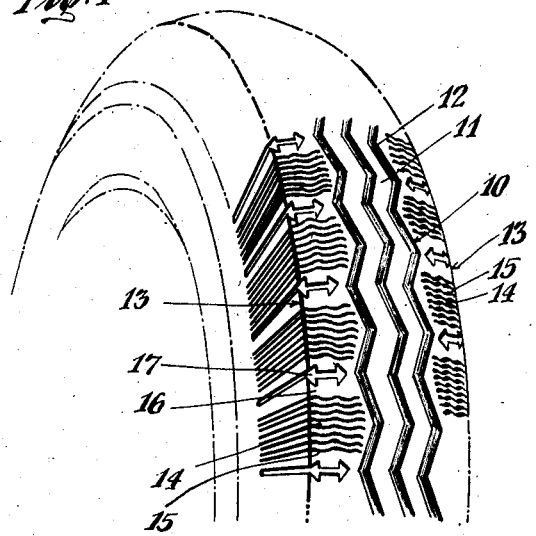
Fig. 1 is a perspective view of a portion of a vehicle tire embodying the obliquely corrugated ribs characteristic of my invention.

Referring now to the drawing, the tire as shown therein for illustrating one specific embodiment of the invention comprises a centrally located primary load carrying and wearing tread surface, 10. This central portion of the tread consists of relatively rigid, i. e., substantially circumferentially inflexible protuberances 11 formed by grooves 12. This central portion may assume any suitable form of construction commonly used in vehicle tire manufacture. On opposite sides of this central tread portion are formed additional tread portions 13. These tread portions are made up of a series of wavy ribs 14 formed by grooves 15 of relatively great depth extending into the tire tread. These ribs and grooves, it will be noted, are formed in groups, and there is located between groups a relatively wide solid supporting block or section of the rubber tread 16. This block 16 may have formed in it one main groove 17. These blocks or solid rubber portions 16 form a support between the groups of ribs 14 and prevent the strength of the tread from being weakened to any material extent thereby.

Figure 2:
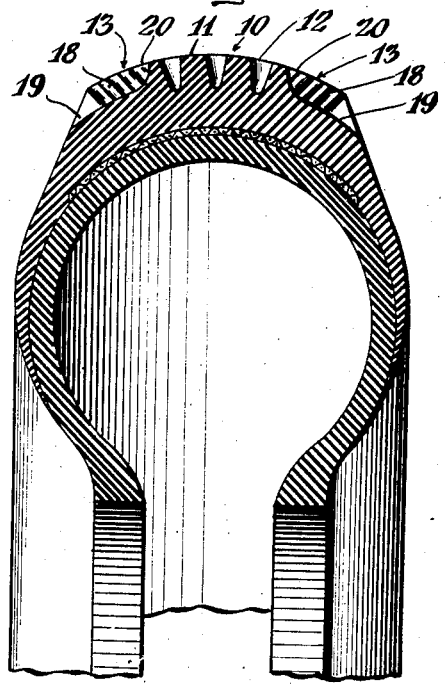
Fig. 2 is a cross-section of the tire showing the relationship of the oblique corrugations to the remainder of the tire tread.
Figure 3:
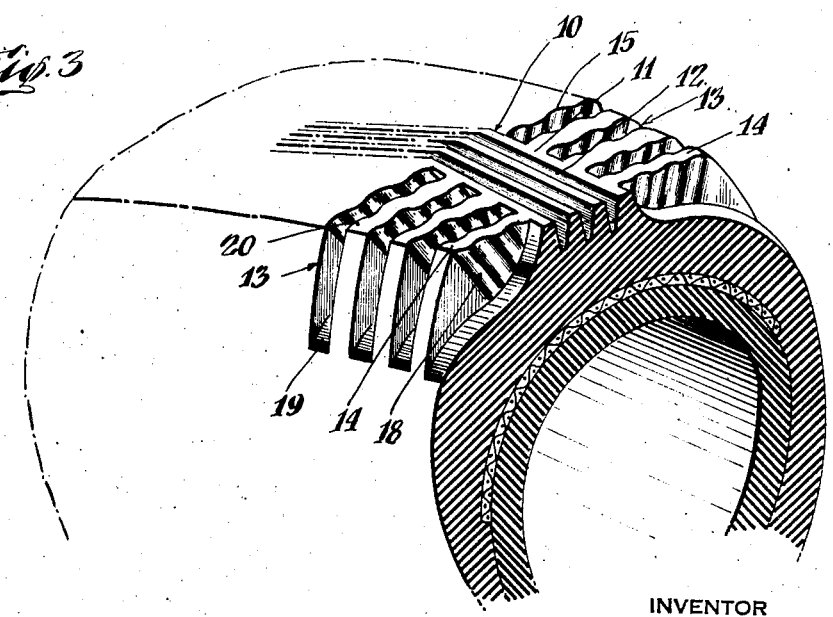
Fig. 3 is a fragmentary perspective view, greatly enlarged, to show the details of the obliquely corrugated ribs.

The obliquely corrugated ribs that constitute one of the principal features of this invention are illustrated more clearly in Figs. 2 and 3. As shown therein, each of these ribs has corrugated side surfaces containing a series of corrugations 18 which extend from the lower surface 19 of the two tread portions 13 up to the wearing and load carrying tread surface 20. These corrugations 18 are moulded into the side surfaces of the ribs 14 in a direction that is oblique of the ribs 14, oblique to the top tread surface 20, and oblique to the primary load carrying central tread surface 10. The corrugations shown in the drawing are formed at approximately 45° to a perpendicular to the tread surface of the tire, but it is to be understood, of course, that the corrugations may extend at any desired obtuse or acute angle with respect to the ribs and with respect to the tread surface of the arcuate tread of the tire.

The ribs 14, in the modification shown in the drawing, extend laterally from the central tread portion 10. They are preferably moulded in the tread sections 13 on opposite sides of the central portion 10 and are extremely flexible longitudinally and laterally. They may be located as shown at substantially right angles to the central tread portion 10 or at any other desired angle thereto. According to an embodiment that I have found commercially satisfactory, the ribs are of substantially greater height than width and are so spaced that the grooves between juxtaposed ribs are of less width than the ribs, the depth of the ribs being substantially the same as the entire thickness of the tread band. Various modifications of these dimensions may, of course, be made within the scope of this invention.

The drawing illustrates only one specific form of tire to which the important obliquely corrugated ribs of my present invention may be applied, but with this disclosure in mind it will become apparent to those skilled in the art that the invention is adaptable to many other forms of tires. For example, the corrugated ribs may be located at any desired place or places in the tread of the tire. They may cover only certain portions of the tread or the entire tread contacting surface, thus replacing, if desired, the central tread portion 10 shown in the drawing by these ribs.

In view of the fact that the corrugations formed on the side surfaces of the ribs are obliquely located with respect to the surface of the tire tread that contacts the roadway, it will prove very difficult for mud, dirt, pebbles, stones and other such foreign bodies to penetrate into the grooves between juxtaposed ribs. In fact, when these corrugations are inclined as illustrated, the foreign bodies can penetrate between two adjacent ribs along a radial direction only by passing obliquely over one or more of the corrugations. Thus, to effectively penetrate between the adjacent ribs, it would be necessary for the foreign bodies to spread apart the two ribs to a materially greater extent than would be necessary if the corrugations were formed perpendicularly to the tread surface and to the roadway.

It has been found that the force necessary to effect displacement or separation of the ribs by pebbles, etc., sufficient to provide penetration of these bodies between the ribs, is so great that it is practically impossible for the foreign bodies to enter in the normal radial direction. Any bodies tending to enter between the ribs in a radial manner will tend to slide laterally along the corrugations. However, the force which normally acts in that direction will only be the component along that direction of the radial force exerted by the road on the foreign body. This force will, therefore, be considerably reduced and consequently the penetration of the body will be very difficult.

In addition to the above described practical useful characteristics of the improved tire of my present invention from the operating standpoint, especially, for preventing interference by foreign bodies and for maintaining effectively the non-skid characteristics of the tire, my invention also is useful in the manufacture of tires. For example, the removal of the tire from the mould is effected with great facility when the corrugated side surfaces of the ribs are formed obliquely wtih respect to the arcuate tread surface of the tire instead of perpendicularly thereto.

While the invention has been described and illustrated with particular reference to corrugations of a sinusoidal or wavy form, it is to be understood, of course, that various modifications may be made in the formation of these corrugations and that they may assume any desired suitable form and location to accomplish the above described purposes of this invention.

I claim:

1. A vehicle tire having an arcuate tread comprising a plurality of flexible ribs which are angularly disposed with respect to the center line of the tread, said ribs having corrugated side surfaces the corrugations of which extend inwardly from and at an oblique angle to the surface of the ribs which lies in the road contacting surface of the tread.

2. A vehicle tire having an arcuate tread comprising a plurality of flexible ribs, radially disposed around the tire, and having corrugated side surfaces the corrugations of which extend at an acute angle to the side surface of the ribs.

3. A vehicle tire having in its tread a plurality of relatively closely spaced flexible ribs of greater height than width and flexible under deforming stresses, and having corrugated side surfaces the corrugations of which extend inwardly from and at an oblique angle to the edges of the ribs which form a portion of the road contacting surface of the tread.

4. A vehicle tire having in its tread surface a plurality of relatively closely spaced flexible ribs of greater height than width and flexible under deforming stresses, and having corrugated side surfaces the corrugations of which extend inwardly from and at an acute angle to the side surface of the ribs.

5. A vehicle tire having in its tread a plurality of highly flexible ribs of substantially less width than the tread band, said ribs being flexible laterally and longitudinally under deforming stresses, and being spaced so that the grooves between juxtaposed ribs are of less width than the ribs, said ribs having corrugated side surfaces the corrugations of which extend inwardly from and at an oblique angle to the edges of the ribs which lie in the road contacting surface of the tread.

6. A vehicle tire having a tread band formed with a plurality of relatively rigid blocks spaced circumferentially thereof and groups of highly flexible ribs of greater height than width disposed between said blocks, said ribs having corrugated side surfaces the corrugations of which extend inwardly from and at an oblique angle to the edges of the ribs which lie in the road contacting surface of the tread band.

7. A vehicle tire having a tread which comprises a plurality of flexible ribs, said ribs being disposed at an angle to the center line of the tread and having corrugations in their adjacent sides, said corrugations extending inwardly from and at an acute angle to the edges of the ribs which lie in the road contacting surface of the tread.

PIERRE MARCEL BOURDON.